(12) United States Patent
Brown

(10) Patent No.: US 8,638,524 B2
(45) Date of Patent: Jan. 28, 2014

(54) HELIUM FILLED SEALED HDD USING GAS FLOW DIVERSION FILTRATION TO IMPROVE PARTICLE CLEANUP

(75) Inventor: Charles Allan Brown, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/270,413

(22) Filed: Oct. 11, 2011

(65) Prior Publication Data

US 2013/0088795 A1 Apr. 11, 2013

(51) Int. Cl.
*G11B 33/14* (2006.01)

(52) U.S. Cl.
USPC ..................... 360/97.17; 360/97.15

(58) Field of Classification Search
USPC ........... 360/97.13, 97.14, 97.15, 97.16, 97.17
See application file for complete search history.

(56) References Cited

U.S. PATENT DOCUMENTS

| | | | |
|---|---|---|---|
| 4,369,475 A | 1/1983 | Ho et al. | |
| 4,710,830 A * | 12/1987 | Imai et al. | 360/97.16 |
| 6,208,484 B1 | 3/2001 | Voights | |
| 6,940,687 B2 | 9/2005 | Hong et al. | |
| 7,095,584 B2 | 8/2006 | Logan | |
| 7,203,030 B2 | 4/2007 | Chan et al. | |
| 7,239,475 B1 | 7/2007 | Lin et al. | |
| 7,306,659 B2 | 12/2007 | Gorton et al. | |
| 7,830,636 B2 | 11/2010 | Ang et al. | |
| 2003/0156351 A1 * | 8/2003 | Voights et al. | 360/97.02 |
| 2003/0156352 A1 * | 8/2003 | Voights et al. | 360/97.02 |
| 2003/0202276 A1 * | 10/2003 | Smith | 360/97.02 |
| 2004/0212920 A1 * | 10/2004 | Tadepalli et al. | 360/97.02 |
| 2007/0002490 A1 * | 1/2007 | Suwa et al. | 360/97.02 |
| 2007/0188914 A1 * | 8/2007 | Gross | 360/97.02 |
| 2008/0084631 A1 * | 4/2008 | Chan et al. | 360/97.02 |
| 2008/0112074 A1 | 5/2008 | Yao et al. | |
| 2010/0061010 A1 | 3/2010 | Niu et al. | |
| 2011/0090592 A1 * | 4/2011 | Hendriks et al. | 360/97.02 |

OTHER PUBLICATIONS

David E. Fowler et al., "Protecting the Head/Disk Interface From the Chemical Environment With Disk Drive Filtration", IEEE Transactions on Magnetics, vol. 39, No. 2, Mar. 2003, 6 pages.
Kirpekar et al., "A Study on the efficacy of flow mitigation devices in hard disk drives", IEEE Transactions on Magnetics, vol. 42, No. 6, Jun. 2006, 15 pages.

* cited by examiner

*Primary Examiner* — Craig A. Renner
(74) *Attorney, Agent, or Firm* — Brokaw Patent Law PC; John D. Henkhaus; Christopher J. Brokaw

(57) ABSTRACT

Approaches for a hard-disk drive (HDD) comprised within a sealed enclosure that is filled with a substantially helium gas are provided. The HDD may include a shroud that surrounds a majority of a perimeter of a magnetic-recording disk. The HDD may also include an upstream spoiler having one or more wings. The shape of the upstream spoiler diverts a flow of the substantially helium gas that circulates when the magnetic-recording disk is rotating from a magnetic-recording head to a plenum chamber. The plenum chamber has a mouth that allows a portion of the circulating flow of substantially helium gas to flow therein. The mouth of the plenum chamber is a gap in the shroud that is prior to the upstream spoiler in the circulating flow of the substantially helium gas. A portion of the plenum chamber is formed using a particle filter opposing the gap.

19 Claims, 5 Drawing Sheets

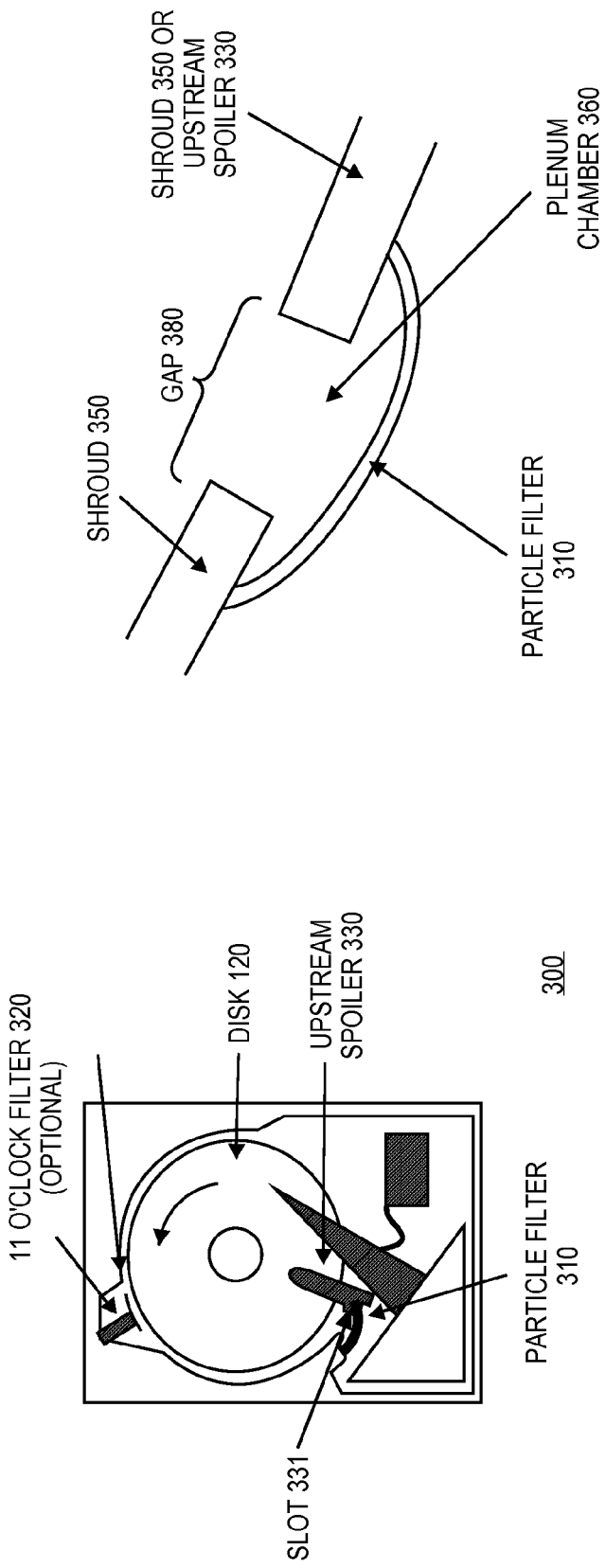

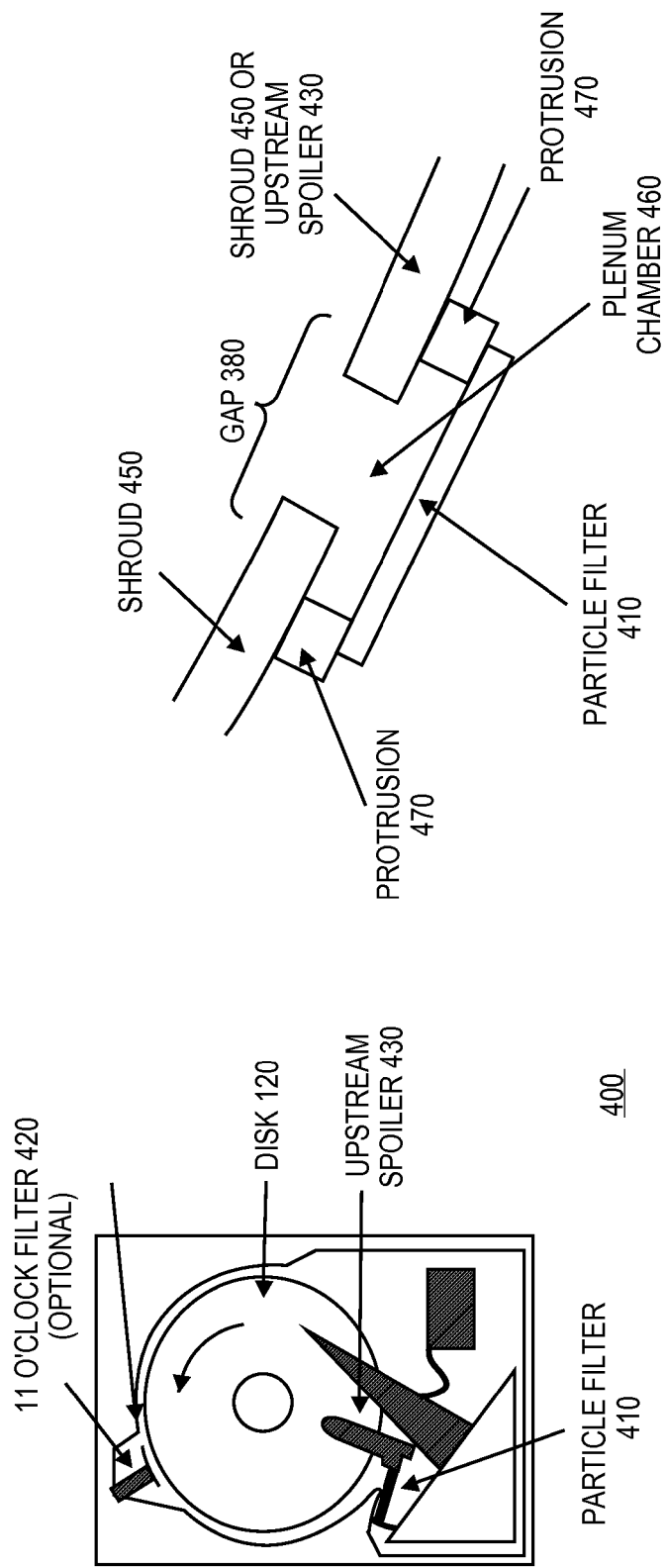

Side View of Particle Filter

Top View of Particle Filter

HELIUM FILLED SEALED HDD USING GAS FLOW DIVERSION FILTRATION TO IMPROVE PARTICLE CLEANUP

FIELD OF THE INVENTION

Embodiments of the invention generally relate to improving gas filtration in a hard-disk drive (HDD) that is sealed and filled with a gas that is lighter than ambient air, and more specifically relate to improving gas filtration in a hard-disk drive (HDD) that is sealed and filled with a substantially helium gas.

BACKGROUND OF THE INVENTION

The operation of certain computer equipment can be negatively affected by the presence of environmental hazards, such as airborne contaminants. To prevent this harm from occurring, some sensitive equipment may be housed in an enclosure that is designed to keep out airborne contaminants.

An example of a piece of sensitive equipment housed within a protective enclosure is a hard-disk drive (HDD). An HDD is a non-volatile storage device, which is housed in a protective enclosure, that stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of a platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

Very small airborne particles, such as the size of 10 nm to 1000 nm (1 micron), may adhere to the air bearing surfaces of either a read/write head or deposit on the surface of the magnetic platters (disk stack). When the surface of either a read/write head or a platter becomes attached to an airborne particle, it is more likely that a read/write head may not read data properly or may scrape across the surface of a platter, which could grind away the thin magnetic film of the platter and cause data loss and potentially render the HDD inoperable.

As a natural part of the manufacturing process, a certain amount of airborne particles may be introduced into the interior of the enclosure of the HDD. Additionally, during operation, certain parts within the interior of the HDD may rub or bump each other in a manner that causes airborne particles to be released. To remove airborne particles from the interior of a HDD, airborne particle filters may be positioned inside the interior of the enclosure as well as around an air passage in the enclosure used to equalize the pressure between the interior and the exterior of the enclosure. These airborne particle filters are typically situated in a flow of air caused by the rotation of the platters. As the air flows through the airborne particle filters, particles carried by the air may become trapped in the airborne particle filter, thereby cleaning the air.

As the amount of air flowing through an airborne particle filter increases, the number of airborne particles trapped by the airborne particle filter will also increase. However, as the rate of the air flow circulating within the enclosure of the HDD increases, the likelihood that the circulating air flow will disturb the operation of the magnetic read/write head also increases. Thus, airborne particle filters are typically designed to collect as much airborne particles from the air as possible without disturbing the proper operation of the magnetic read/write head.

Disk drive systems, in certain contexts, may be filled with a gas other than ambient air, such as helium. This may be advantageous because helium is a lighter gas than ambient air and causes less turbulence and disk flutter when the hard disk drive is in operation. However, using gases lighter than ambient air in the interior of a hard disk drive can negatively impact the performance of filtration because there is less of a pressure differential produced across particle filters.

SUMMARY OF THE INVENTION

Techniques are provided for improving the gas filtration in a hard-disk drive (HDD) that is sealed and filled with a gas lighter than ambient air, such as a substantially helium gas. In an embodiment, a hard-disk drive (HDD) is comprised within a sealed enclosure that is filled with a substantially helium gas. The HDD may include a shroud that surrounds a majority of a perimeter of a magnetic-recording disk. The HDD may also include an upstream spoiler having one or more wings. The shape of the upstream spoiler diverts a flow of the substantially helium gas that circulates when the magnetic-recording disk is rotating from a magnetic-recording head to a plenum chamber. The plenum chamber has a mouth that allows a portion of the circulating flow of substantially helium gas to flow therein. The mouth of the plenum chamber is a gap in the shroud that is prior to the upstream spoiler in the circulating flow of the substantially helium gas. A portion of the plenum chamber is formed using a particle filter opposing the gap.

The substantially helium gas may be directed through the particle filter using the upstream spoiler and the plenum chamber to ensure a sufficient pressure drop through the particle filter. For example, use of the plenum chamber may yield a 23 Pascal (Pa) to 27 Pascal (Pa) pressure drop across the particle filter. Additionally, the area of the particle filter may be maximized to increase the particle cleanup rate. For example, the width of the particle filter may be longer than the width of the mouth of the plenum chamber. Indeed, the width of the particle filter may be about 1.25 to about 10 times the mouth of the plenum chamber in some embodiments, and preferably from about 2.3 to about 5 times the mouth of the plenum chamber in some cases.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 3A is an illustration of a HDD having a particle filter according to one embodiment of the invention FIG. 3B is an illustration depicting a magnified view of the particle filter shown in FIG. 3A;

FIG. 4A is an illustration of a HDD having a particle filter according to another embodiment of the invention;

FIG. 4B is an illustration depicting a magnified view of the particle filter shown in FIG. 4A.

DETAILED DESCRIPTION OF THE INVENTION

Approaches for improving gas filtration in a hard-disk drive (HDD) that is sealed and filled with a gas lighter than ambient air, such as a substantially helium gas, are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Physical Description of Illustrative Embodiments of the Invention

Figure 1:
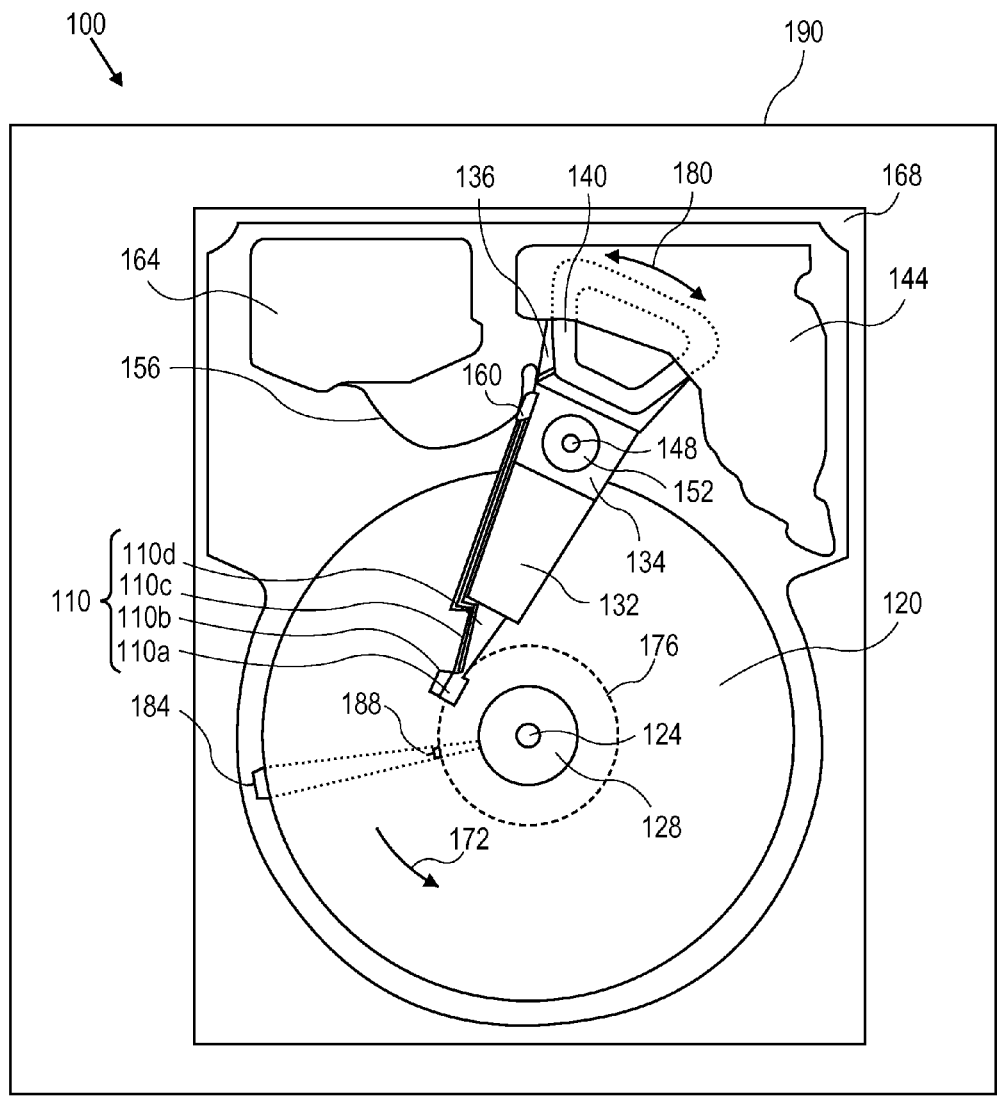
FIG. 1 is an illustration of a plan view of an HDD according to an embodiment of the invention.

With reference to FIG. 1, in accordance with an embodiment of the present invention, a plan view of a HDD 100 is shown. FIG. 1 illustrates the functional arrangement of components of the HDD including a slider 110b including a magnetic-recording head 110a. The HDD 100 includes at least one HGA 110 including the head 110a, a lead suspension 110c attached to the head 110a, and a loadbeam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 entrains air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the present invention also encompass HDD 100 that includes the HGA 110, the disk 120 rotatably mounted on the spindle 124, the arm 132 attached to the HGA 110 including the slider 110b including the head 110a.

HDD 100 further includes enclosure 190. Enclosure 190 may be embodied by any gas tight enclosure. In an embodiment, enclosure 190 is hermetically sealed to provide a gas tight environment. Enclosure 190 may be welded, e.g., laser welded, over HDD housing 168 and regular cover of HDD 100 after the hard-disk drive was been manufactured and tested to satisfaction.

The purpose of enclosure 190 is to contain a gas that is lighter than ambient air. In a specific example discussed herein, the gas contained within enclosure 190 is a substantially helium gas. In other embodiments of the invention, enclosure 190 may contain a gas, other than helium, that is lighter than ambient air.

Figure 2:
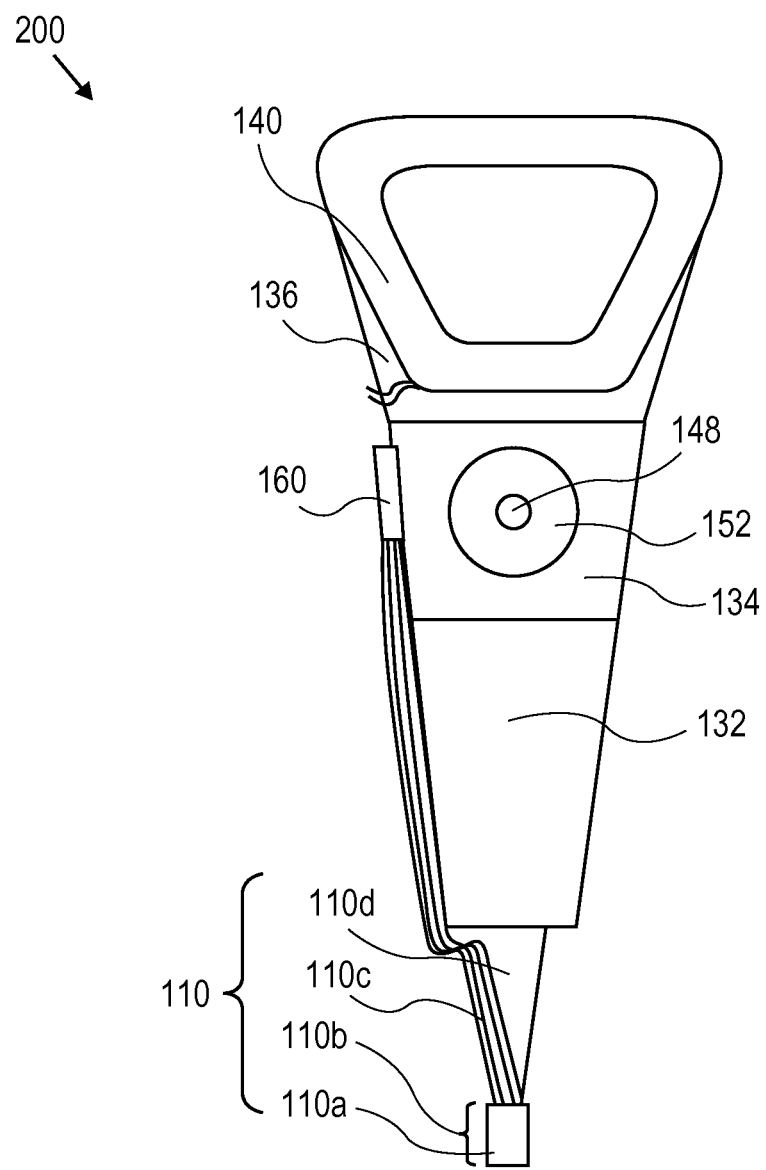
FIG. 2 is an illustration of a plan view of a head-arm-assembly (HAA) according to an embodiment of the invention.

With reference now to FIG. 2, in accordance with an embodiment of the present invention, a plan view of a head-arm-assembly (HAA) 200 including the HGA 110 is shown. FIG. 2 illustrates the functional arrangement of the HAA 200 with respect to the HGA 110. The HAA includes the arm 132 and HGA 110 including the slider 110*b* including the head 110*a*. The HAA 200 is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Improving Gas Filtration in a Lighter than Ambient Air Environment

In an embodiment, enclosure 190 of HDD 100 is sealed and filled with a gas that is lighter than ambient air, such as helium. For purposes of providing a concrete example, embodiments will be discussed with reference to enclosure 190 being filled with helium, although enclosure 190 may be filed with other gases that are lighter than ambient air besides helium.

When HDD 100 operates in a substantially helium environment, turbulence and disk flutter are considerably reduced as a result of the lower energy transferred by the helium gas. However, at the same time filtration is negatively affected. For example, in a hard-disk drive that operates at 7200 RPM in ambient air may have a particle cleanup rate of 0.6 liters per minute (l/min), but the same drive operating, while being filled with helium, may have a particle cleanup rate of 0.15 l/min. Particles may also removed by impacting against a surface, and thus, the total cleanup rate of this drive in ambient air may be 1.2-1.4 l/min with various filters. However, in helium, the overall particle cleanup rate may be less than half that. If particles land on the cover or base of a hard-disk drive, and do not subsequently become dislodged, then these particles are effectively removed. However, if particles land on the disk, then this presents a potential risk to the head/disk interface. Therefore, it is advantageous, when HDD 100 is operating in helium, to increase both the total particle removal rate and the fraction of particles that are captured by filtration.

To improve filtration of the helium gas within enclosure 190, embodiments may employ a particle filter that is particularly designed to operate in gas that is lighter than ambient air. In an embodiment, helium gas may be directed through the particle filter using a plenum chamber to ensure a sufficient pressure drop through the particle filter. For example, use of a plenum chamber may yield a 23 Pascal (Pa) to 27 Pascal (Pa) pressure drop across the particle filter. Additionally, the area of the particle filter may be maximized to increase the particle cleanup rate. For example, the width of the particle filter may be longer than the width of the mouth of the plenum chamber. The particle filter should have a width of at least equal to the length of the mouth of the plenum chamber. Indeed, the width of the particle filter may be about 1.25 to about 10 times the mouth of the plenum chamber in some embodiments. The particle filter, in certain embodiments, may be about 2.3 to about 5 times the mouth of the plenum chamber. As helium has a lower density than ambient air, the size of the particle filter should be selected to ensure a sufficient pressure drop across it and to possess sufficient area for filtering. Also, the size of the particle filter should also accommodate the design constraints of the HDD, e.g., the particle filter must not be larger than can be accommodated once the particle filter is affixed within the HDD. The particular size ranges mentioned herein have been shown to achieve these benefits without being sized too large as to be incompatible with the form factor of typical HDDs.

To make full utilization of the gas stream available through the plenum chamber, the particle filter should have a significantly larger area than the mouth of the plenum chamber. This is desirable for the operation in helium where the pressure is low. The relatively small difference in pressure in helium without, or with, any resistance in the mouth of the plenum chamber indicates that there is a large volume of gas available. Thus, a large filter will filter more gas, and yield enhanced particle cleanup rates.

FIG. 3A is an illustration of HDD 300 having particle filter 310 according to an embodiment of the invention. For clarity, not all of the hard-disk drive components depicted in FIGS. 1 and 2 are shown in FIG. 3A. In FIG. 3A, HDD 300 is depicted as having two filters, namely particle filter 310 and 11 o'clock filter 320. 11 o'clock filter 320 derives its name from its location, which corresponds to the $11^{th}$ hour on a clock face. Note that 11 o'clock filter 320 is optional, as the efficiency of particle filter 310 may be sufficient in certain embodiments as to render the cost of including 11 o'clock filter 320 in HDD 100 unnecessary.

FIG. 3A also depicts upstream spoiler 330. Upstream spoiler 330 has one or more wings or protrusions which are interleaved between the one or more magnetic-recording disks 120 of HDD 100. The shape of upstream spoiler 330 directs a flow of the substantially helium gas that circulates when the one or more magnetic-recording disks 120 are rotating to a plenum chamber, which is depicted as plenum chamber 360 in FIG. 3B. The wings or protrusions of upstream spoiler may be shaped differently in various embodiments, such as being substantially straight and oriented along the axis between the location the wing and the center of the disk spindle, being substantially straight and oriented to lie more in the rotational direction of the disks than the axis between the location of the wings and the center of the disk spindle, or having a curved shape. The wings of upstream spoiler 330 may also extend between the one or more magnetic-recording disks 120 not less than 0.1 times nor more than 0.95 times the distance from the outer diameter (OD) to the inner diameter (ID) of the disk in an embodiment. Alternately, the wings of upstream spoiler 330 may also extend between the one or more magnetic-recording disks 120 not less than 0.2 times nor more than 0.75 times the distance from the outer diameter (OD) to the inner diameter (ID) of the disk in an embodiment.

FIG. 3B is an illustration depicting a magnified view of particle filter 310 shown in FIG. 3A. FIG. 3B depicts shroud 350, which is a circular component that surrounds a majority of the perimeter of one or more magnetic-recording disks 120. Plenum chamber 360 has a mouth that allows a portion of the circulating flow of substantially helium gas to flow therein. In an embodiment, the mouth of plenum chamber 360 is gap 380 in shroud 350 that is located prior to upstream spoiler 330 in the flow of the substantially helium gas that circulates when HDD 100 is in operation.

Alternately, the mouth of plenum chamber 360 may be a gap 380 in shroud 350 and upstream spoiler 330—in other words the mouth of plenum chamber 360 need not exclusively be formed out of shroud 350, but also may be formed using one or more of shroud 350 and upstream spoiler 330. In an embodiment, the length of gap 380 may be minimized to avoid unnecessary interruption with shroud 350.

As shown in FIG. 3B, particle filter 310 has a curved shape. Each end of particle filter 310 may be affixed to structures on either side of gap 380, such as shroud 350 and/or upstream spoiler 330 as depicted in FIG. 3B. Particle filter 310 is on the opposite side of shroud 350 than the one or more magnetic-recording disks 120.

As shown in FIG. 3B, a portion of plenum chamber 360 is formed using particle filter 310 opposing gap 380. The width of particle filter 310 is longer than the width of gap 380. Indeed, the width of particle filter 310 may be 1.25 to 5 times the width of gap 380.

FIG. 4A is an illustration of HDD 400 having particle filter 410 according to an embodiment of the invention. As before, for clarity, not all of the hard-disk drive components depicted in FIGS. 1 and 2 are shown in FIG. 4A. Note that 11 o'clock filter 420 is optional, as the efficiency of particle filter 410 may be sufficient in certain embodiments as to render the cost of including 11 o'clock filter 420 in HDD 400 unnecessary. FIG. 4B is an illustration depicting a magnified view of particle filter 410 shown in FIG. 4A.

As shown in FIG. 4B, particle filter 410 has a straight shape and a portion of plenum chamber 460 is formed using particle filter 410 opposing gap 380. Each end of particle filter 410 is affixed to a protrusion 470 that extends from shroud 450 and/or upstream spoiler 430. Particle filter 410 is on the opposite side of shroud 450 than the one or more magnetic-recording disks 120. The ends of particle filter 410 may be affixed to a protrusion 470 using a variety of different mechanisms. For example, in an embodiment, one of protrusion 470 and particle filter 410 may possess a channel or recess therein, and the other of protrusion 470 and particle filter 410 may possess an extension or protrusion shaped to fit within the channel or recess. In this way, particle filter 410 may be affixed to protrusions 470 by positioning the extensions or protrusions into the channel or recess to cause the particle filter 410 to be secured in place. Similarly, particle filter 410 may be affixed against shroud 450 or upstream spoiler 430 in the same manner. Alternatively, particle filter 310 or 410 may be affixed against a component using a different approach, such as, for example, by bonding (such as heat staking) or using an adhesive.

While not depicted in FIG. 4B, particle filter 410 may also have a curved shape such as particle filter 310 is shown having in FIG. 3B. In other words, a particle filter having a curved shape may also be affixed to protrusions 470 in certain embodiments.

Figure 5A:
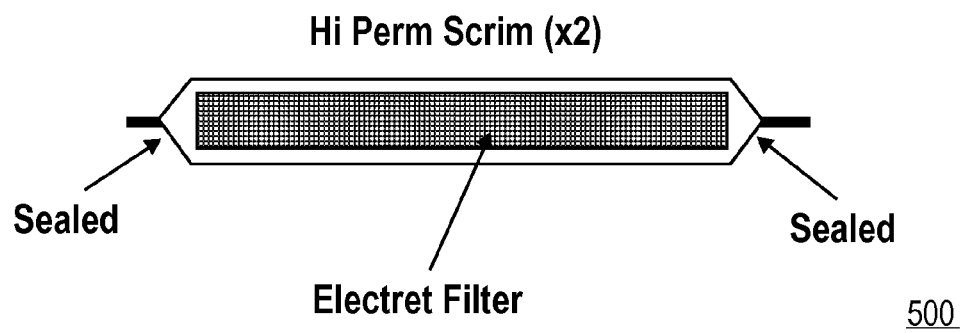
FIGS. 5A and 5B are side and top views of a particle filter according to an embodiment of the invention.
Figure 5B:
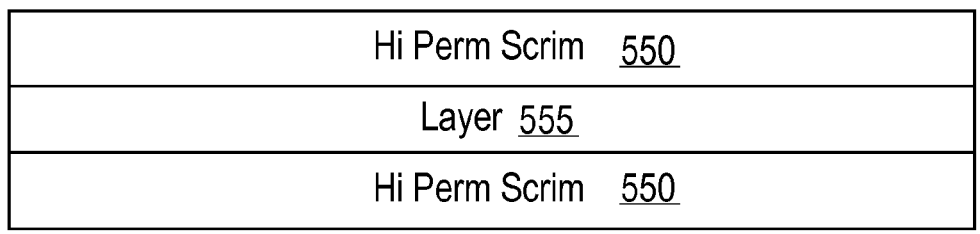

FIGS. 5A and 5B are side and top views of particle filter 500 according to an embodiment of the invention. Particle filter 500 of FIG. 5 may be used as particle filter 310 or particle filter 410 in certain embodiments. Particle filter 500 comprises an activated carbon layer or carbon components 555 that is enclosed on either side by high permeability scrim 550. Alternately or additionally, later 555 may comprise additional treatments to allow enhanced capture of containments. Alternately or additionally, layer 555 may comprise or correspond to electrostatic filter media.

In an embodiment, particle filter 500 may be attached to the assembly comprising the upstream spoiler, such as upstream spoiler 330 (FIG. 3A). In such a case, the assembly comprising the upstream spoiler may be a separate component inserted into the HDD during assembly. Alternately, particle filter 500 may be inserted into a slot 331 (FIG. 3A) in the assembly comprising the upstream spoiler 330. Another option for affixing particle filter inside a HDD would be to insert particle filter 500 into features cast into the metal of the base of the HDD so as to orient particle filter 500 correctly relative to the upstream spoiler.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   a sealed enclosure that is filled with a substantial helium gas;
   a magnetic-recording head;
   a magnetic-recording disk rotatably mounted on a spindle;
   a drive motor having a motor shaft attached to said spindle for rotating said magnetic-recording disk;
   a voice-coil motor configured to move said magnetic-recording head to access portions of said magnetic-recording disk;
   a shroud that surrounds a majority of the perimeter of the magnetic-recording disk;
   an upstream spoiler having one or more wings, wherein the shape of the upstream spoiler directs a flow of the substantial helium gas that circulates when the magnetic-recording disk is rotating to a plenum chamber;
   the plenum chamber, wherein the plenum chamber has a mouth that allows a portion of the circulating flow of substantial helium gas to flow therein, wherein the mouth of the plenum chamber is a gap in the shroud that is prior to the upstream spoiler in the circulating flow of the substantial helium gas;
   a particle filter having a longitudinally curved shape with a curvature greater than a curvature conforming to components with which the particle filter is coupled at each end, the greater curvature providing a helium pressure differential across the particle filter that is greater than a helium pressure differential that would otherwise be provided with a particle filter having a curvature conforming to the components with which the particle filter is coupled; and
   wherein a portion of the plenum chamber is formed using the particle filter opposing the gap.

2. The hard-disk drive (HDD) of claim 1, wherein the particle filter has a larger area than the gap.

3. The hard-disk drive (HDD) of claim 1, wherein the particle filter has a width that is 2.3 to 5 times the length the gap.

4. The hard-disk drive (HDD) of claim 1, wherein the particle filter is on the opposite side of the shroud than the magnetic-recording disk.

5. The hard-disk drive (HDD) of claim 1, wherein the particle filter comprises electrostatic filter media.

6. The hard-disk drive (HDD) of claim 1, wherein the particle filter comprises an activated carbon layer or carbon components disposed between layers of electrostatic filter media.

7. The hard-disk drive (HDD) of claim 1, wherein the shroud does not have a bypass channel.

8. The hard-disk drive (HDD) of claim 1, wherein the HDD comprises a filter centered at around the 11 o'clock location.

9. The hard-disk drive (HDD) of claim 1, wherein the particle filter provides a 23 pascal (Pa) to 27 pascal (Pa) pressure drop when the circulating flow of substantial helium gas flows therethrough.

10. The hard-disk drive (HDD) of claim 1, wherein the curvature of the particle filter is greater than the curvature of the shroud with which the particle filter is coupled.

11. A hard-disk drive (HDD), comprising:
a sealed enclosure that is filled with a substantial helium gas;
a disk;
a shroud;
a spoiler having one or more wings, wherein the shape of the spoiler diverts a flow of the substantial helium gas that circulates, when the disk is rotating, to a plenum chamber;
the plenum chamber, wherein the plenum chamber has a mouth that allows a portion of the circulating flow of substantial helium gas to flow therein;
a particle filter having a longitudinally curved shape with a curvature greater than a curvature of the shroud with which the particle filter is coupled, the greater curvature providing a helium pressure differential across the particle filter that is greater than a helium pressure differential that would otherwise be provided with a particle filter having a curvature conforming to the curvature of the shroud; and
wherein a portion of the plenum chamber is formed using the particle filter opposing a gap, and wherein the particle filter has a width that is 2.3 to 5 times the length of the mouth.

12. The hard-disk drive (HDD) of claim 11, wherein the particle filter is on the opposite side of the shroud than the disk.

13. The hard-disk drive (HDD) of claim 11, wherein the particle filter comprises electrostatic filter media.

14. The hard-disk drive (HDD) of claim 11, wherein the particle filter comprises an activated carbon layer or carbon components disposed between layers of electrostatic filter media.

15. The hard-disk drive (HDD) of claim 11, wherein the shroud does not have a bypass channel.

16. The hard-disk drive (HDD) of claim 11, wherein the HDD comprises a filter centered at around the 11 o'clock location.

17. The hard-disk drive (HDD) of claim 11, wherein the particle filter provides for a 23 pascal (Pa) to 27 pascal (Pa) pressure drop when the circulating flow of substantial helium gas flows therethrough.

18. A hard-disk drive (HDD), comprising:
a sealed enclosure that is filled with a gas that is lighter than ambient air;
a disk;
a spoiler having one or more wings, wherein the shape of the spoiler diverts a flow of the gas that circulates, when the disk is rotating, to a plenum chamber;
the plenum chamber, wherein the plenum chamber has a mouth that allows a portion of the flow of circulating gas to flow therein;
a particle filter having a longitudinally curved shape with a curvature greater than a curvature conforming to components with which the particle filter is coupled at each end, the greater curvature providing a helium pressure differential across the particle filter that is greater than a helium pressure differential that would otherwise be provided with a particle filter having a curvature conforming to the components with which the particle filter is coupled;
wherein a portion of the plenum chamber is formed using the particle filter opposing a gap, and wherein the particle filter has a width that is 2.3 to 5 times the length of the mouth; and
wherein at least one end of the particle filter is inserted into a slot in an assembly comprising the spoiler.

19. The hard-disk drive (HDD) of claim 18, wherein the curvature of the particle filter is greater than the curvature of a shroud with which the particle filter is coupled at an end opposing the at least one end.

* * * * *